US011862426B1

(12) United States Patent
Wells et al.

(10) Patent No.: US 11,862,426 B1
(45) Date of Patent: Jan. 2, 2024

(54) ELECTRON SOURCE DEVICES, ELECTRON SOURCE ASSEMBLIES, AND METHODS FOR GENERATING ELECTRONS

(71) Applicant: Teledyne FLIR Detection, Inc., Stillwater, OK (US)

(72) Inventors: James Mitchell Wells, West Lafayette, IN (US); Douglas K. Martins, Lafayette, IN (US); Mark Gildersleeve, West Lafayette, IN (US); Rakesh Patel, West Lafayette, IN (US)

(73) Assignee: Teledyne FLIR Detection, Inc., Stillwater, OK (US)

(*) Notice: Subject to any disclaimer, the term of this patent is extended or adjusted under 35 U.S.C. 154(b) by 1496 days.

(21) Appl. No.: 16/024,215

(22) Filed: Jun. 29, 2018

Related U.S. Application Data

(60) Provisional application No. 62/526,841, filed on Jun. 29, 2017.

(51) Int. Cl.
*H01J 3/02* (2006.01)

(52) U.S. Cl.
CPC ......... *H01J 3/025* (2013.01); *H01J 2237/063* (2013.01); *H01J 2237/06366* (2013.01); *H01J 2237/06375* (2013.01)

(58) Field of Classification Search
CPC ....................................................... H01J 3/025
See application file for complete search history.

(56) References Cited

U.S. PATENT DOCUMENTS

| | | | | |
|---|---|---|---|---|
| 4,701,678 A * | 10/1987 | Blacker | H01J 29/51 | 315/368.15 |
| 5,027,043 A * | 6/1991 | Chen | H01J 29/628 | 315/368.11 |
| 5,412,277 A * | 5/1995 | Chen | H01J 29/628 | 313/414 |
| 6,710,533 B2 * | 3/2004 | Miura | H01J 9/02 | 313/442 |
| 6,992,307 B2 * | 1/2006 | Yui | H01J 37/065 | 250/492.1 |
| 8,283,629 B1 * | 10/2012 | Tuggle | H01J 37/05 | 250/311 |

OTHER PUBLICATIONS

Abdel Salam, F.W., et al., "Glow Discharge Electron Gun", RRJPAP vol. 2, Issue 2, Apr.-Jun. 2014, pp. 13-20, India.

Burdovitsin, V.A., et al, "Fore-vacuum plasma-cathode electron sources", Laser and Particle Beams (2008), 6, pp. 619-635, United States.

Chalkha, A., et al., "A dc glow discharge as a source of electrons for a portable mass spectrometer: characterization of the electron current intensity and electron kinetic energy distribution", Plasma Sources Sci. Technol. 24 (2015) pp. 1-8, United Kingdom.

(Continued)

*Primary Examiner* — Joseph L Williams
(74) *Attorney, Agent, or Firm* — Haynes and Boone, LLP

(57) ABSTRACT

The present disclosure provides electron source devices, electron source assemblies, and/or methods for generating electrons. The generated electrons can be used to facilitate spectroscopy, such as mass spectrometry, including mass selection or ion mobility.

20 Claims, 5 Drawing Sheets

(56) References Cited

OTHER PUBLICATIONS

Gleizer, J.Z., et al., "High-current electron beam generation by a pulsed hollow cathode", Jo. App. Phys., vol. 91, No. 5, Mar. 1, 2002, pp. 3431-3443, United States.
Ozur, G.E., et al., "Production and application of low-energy, high-current electron beams", Laser and Particle Beams (2003), 21, pp. 157-174, United States.
Rocca, .J.J., et al., "Glow-discharge-created electron beams: Cathode materials, electron gun designs, and technological applications", J. Appl. Phys. 56 (3), Aug. 1, 1984, pp. 790-797, United States.
Schoenbach, K.H., et al., "Microhollow cathode discharges", Appl. Phys. Lett 68 (1), Jan. 1, 1996, pp. 13-15, United States.
Schoenbach, Karl H., et al., "High-pressure hollow cathode discharges", Plasma Sources Sci. Technol. 6 (1997); pp. 468-477, United Kingdom.
Zhirkov, I.S., et al., "Discharge Initiation in a Hollow-Cathode Plasma Source of Electrons", Technical Physics, vol. 51, No. 10, 2006, pp. 1379-1382, Russian Federation.

* cited by examiner

ELECTRON SOURCE DEVICES, ELECTRON SOURCE ASSEMBLIES, AND METHODS FOR GENERATING ELECTRONS

CROSS REFERENCE TO RELATED APPLICATION

This application claims priority to and the benefit of U.S. Provisional Patent Application Ser. No. 62/526,841 filed Jun. 29, 2017, entitled "Electron Source Devices, Electron Source Assemblies, and Methods for Generating Electrons", the entirety of which is incorporated by reference herein.

STATEMENT AS TO RIGHTS TO INVENTIONS MADE UNDER FEDERALLY-SPONSORED RESEARCH AND DEVELOPMENT

This invention was made with Government support under Contract HSHQDC-15-C-B0046 awarded by the U.S. Department of Homeland Security Science & Technology Directorate. The Government has certain rights in the invention.

TECHNICAL FIELD

The present disclosure relates to analytical instrumentation and more particularly to electron sources and methods that may be used to facilitate the ionization of samples for analysis using electron sources.

BACKGROUND

Analytical instruments are being utilized in laboratories as well as the field. The field applications can be those that identify threats that range from criminal, security, and terrorist threats. These field applications take place in airport security, border security, and military settings. Mass analysis can provide the fastest, most detailed information about compositions. However, there is a need for even faster and more detailed information.

SUMMARY

The present disclosure provides electron source devices, electron source assemblies, and/or methods for generating electrons. The generated electrons can be used to facilitate spectroscopy, such as mass spectrometry, including mass selection or ion mobility.

Electron source devices are provided that can include: a cathode member operatively aligned with an anode member, both members defining conduits in fluid communication; and a pressure differential extending between the cathode member and the anode member, the pressure differential facilitating fluid flow through the cathode and anode.

Cathode assemblies for an electron source device are also provided. The assemblies can include: a cathode member operatively aligned with an anode member, the cathode member extending along a longitudinal axis, the axis defining a center of the member in one cross section; and a lens conductively associated with the cathode member, the lens defining at least one opening offset from the center.

Lens assemblies for an electron source device are provided as well. The assemblies can include: a pair of lenses conductively associated with a cathode member, the cathode member extending along a longitudinal axis, the axis defining a center of the member in one cross section; and wherein each of the lenses have centers aligned along the axis, wherein one of the pair defines an opening offset from the center, and the other lens defines an opening at the center.

Additionally, electron source devices are provided that can include: a cathode member operatively aligned with an anode member, with both members defining conduits in fluid communication, and wherein the cathode member extends along a longitudinal axis, the axis defining a center of the member in one cross section; a pressure differential extending between the cathode member and the anode member, the pressure differential facilitating fluid flow through the cathode and anode; a first lens conductively associated with the cathode member, the first lens defining at least one opening offset from the center; and a second lens conductively associated with the cathode member and the first lens, the second lens defines an opening within the center of the second lens.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

The present disclosure provides electron source devices, electron source assemblies, and/or methods for generating electrons. The generated electrons can be used to facilitate spectroscopy, such as mass spectrometry, including mass selection or ion mobility.

Figure 1:
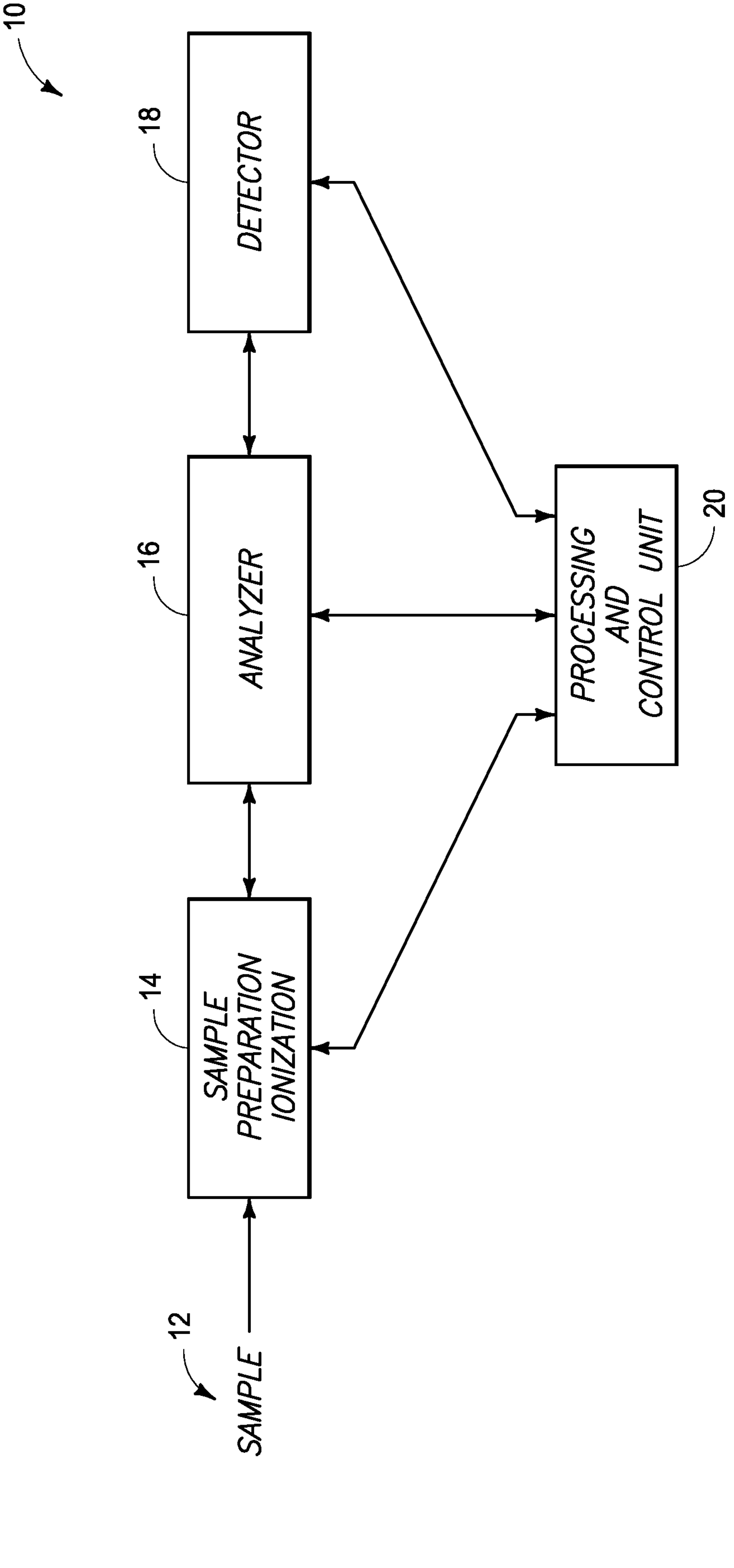
FIG. 1 is a block diagram of an instrument according to an embodiment of the disclosure.

The present disclosure will be described with reference to FIGS. 1-5. Referring first to FIG. 1, a block diagram of an analytical instrument 10 is shown. Analytical instrument 10 includes a sample preparation ionization section 14 configured to receive a sample 12 and convey a prepared and/or ionized sample to an analyzer 16. Instrument 10 can be configured as a mass spectrometer or an ion mobility spectrometer and analyzer 16 can be configured to separate ionized samples for detection by detector 18. Analyzer 16 can be a mass filter, mass separator or an ion mobility separator. In combination with the devices, assemblies, and/or methods of the present disclosure, mass selective detection or ion mobility mass spectrometry may be utilized.

As depicted in FIG. 1, a sample 12 can be introduced into section 14. For purposes of this disclosure, sample 12 represents any chemical composition including both inorganic and organic substances in solid, liquid and/or vapor form. Specific examples of sample 12 suitable for analysis include volatile compounds, such as toluene, or the specific examples include highly-complex non-volatile protein based structures, such as bradykinin. In certain aspects, sample 12 can be a mixture containing more than one substance or in other aspects, sample 12 can be a substantially pure substance. Analysis of sample 12 can be performed according to exemplary aspects described below.

Sample preparation ionization section 14 can include an inlet system (not shown) and an ion source device. The inlet system can introduce an amount of sample 12 into instrument 10. Depending upon sample 12, the inlet system may be configured to prepare sample 12 for ionization. Types of inlet systems can include batch inlets, direct probe inlets, chromatographic inlets, and permeable or capillary membrane inlets. The inlet system may be configured to prepare sample 12 for analysis in the gas, liquid and/or solid phase. In some aspects, the inlet system may be combined with the ion source device.

The ion source device can be configured to receive sample 12 and convert components of sample 12 into analyte ions by exposing the sample to electrons generated by the ion source device. This conversion can include the bombardment of components of sample 12 with the electrons. The ion source device may provide, for example, electron ionization (EI, typically suitable for the gas phase ionization).

Figure 2:
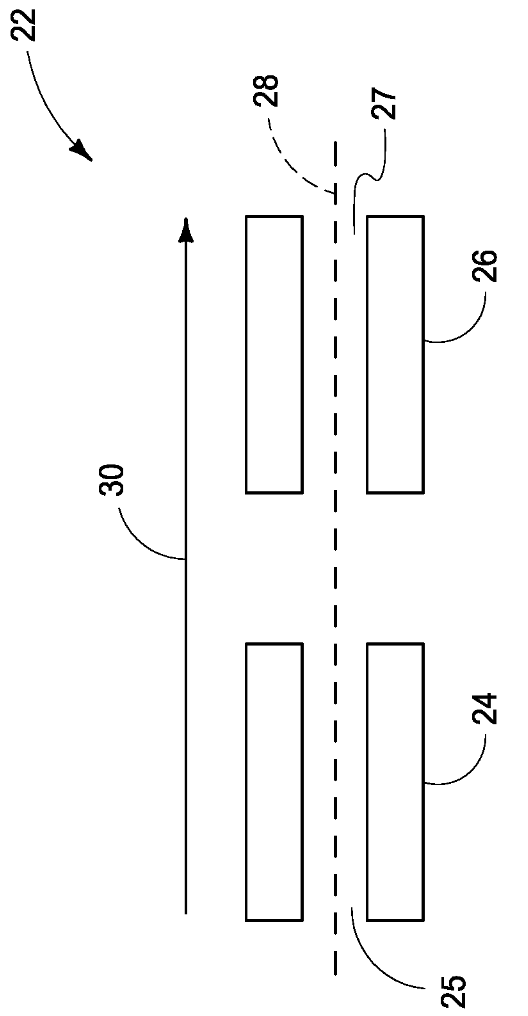
FIG. 2 is a depiction of a configuration of an ion source device for use with the instrument of FIG. 1 according to embodiments of the disclosure.

Referring next to FIG. 2, an electron source device 22 according to an embodiment of the disclosure can include a cathode member 24. Cathode member 24 can be constructed of conductive material such as stainless steel, aluminum, gold, copper, and/or beryllium-copper alloys. In accordance with the implementation of FIG. 2, cathode member 24 can define a fluid conduit 25 and this fluid conduit can extend the length of cathode member 24. Fluid conduit 25 can extend along longitudinal axis 28, for example, and thereby be operatively aligned anode member 26. Anode member 26 can be constructed of material such as stainless steel, aluminum, gold, copper, and/or beryllium-copper alloys; and can define another fluid conduit 27 and this fluid conduit can extend the length of anode member 26. Fluid conduit 27 can also extend along longitudinal axis 28 to operatively align with cathode member 24.

A pressure differential 30 can extend between members 24 and 26, with the pressure within conduit 27 being lower than the pressure within conduit 25, thus facilitating fluid flow between member 24 and 26. In accordance with example implementations, this pressure differential can be facilitated by providing a fluid source to conduit 25. The fluid source can be an inert gas such as helium for example, but other gases such as air, nitrogen, and/or carbon dioxide may be utilized. In accordance with other implementations, a vacuum may be provided to conduit 27, perhaps as part of the analysis portion of the instrument. The vacuum can facilitate the flow of fluid operatively connected with conduit 25.

Figure 3:
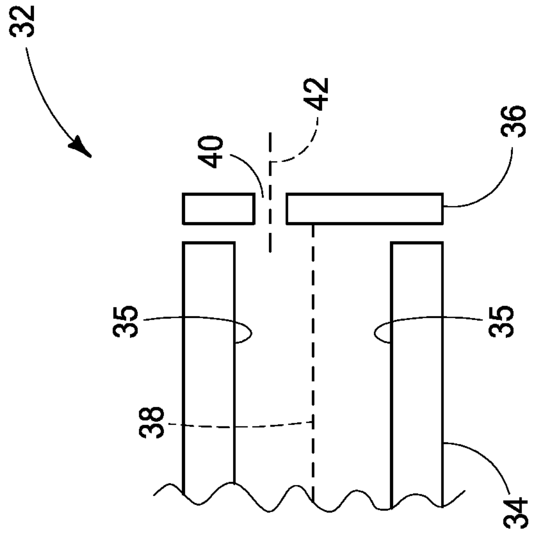
FIG. 3 is a depiction of ion source assemblies for use with the instrument of FIG. 1 according to embodiments of the disclosure.

Referring next to FIG. 3, an assembly 32 within an electron source device is depicted. Assembly 32 may be used as part of the device of FIG. 2, for example. Assembly 32 can include a cathode member 34. Cathode member 34 may be considered a hollow cathode for example, or may be configured as cathode member 24. As part of an electron source device, cathode member 34 can be operatively aligned with an anode member (not shown). Cathode member 34 can extend along a longitudinal axis 38 with axis 38 defining a center of member 34 in at least one cross section.

Assembly 32 can also include a lens 36 that is conductively associated with member 34. For example, member 34 and lens 36 can form a portion of the cathode of the electron source device. Lens 36 can be constructed of conductive material such as stainless steel, aluminum, gold, copper, and/or beryllium-copper alloys. Lens 36 can define at least one opening 40 that is offset from the center of member 34. In accordance with example implementations, lens 36 can define additional openings that are offset from the center of member 34, such as an opposing opening or an opening across from the center of member 34.

Cathode member 34 can define sidewalls 35 for example. One or more of the openings within lens 36 can be associated with one or more of these sidewalls. For example, a center axis 42 of opening 40 can be aligned between axis 38 and sidewall 35 for example. In accordance with example implementations, during operation, electrons emanating from sidewalls 35 can be effectively directed to opening 40 associated with the sidewall.

Figure 4:
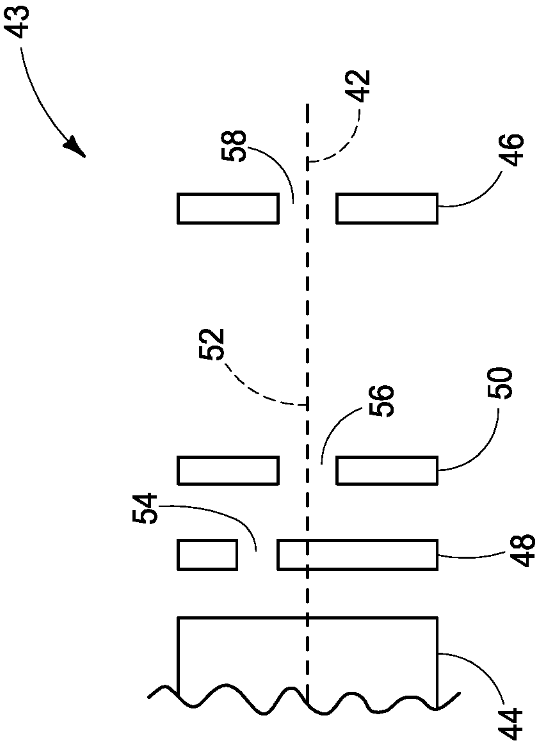
FIG. 4 is a depiction of ion source assemblies for use with the instrument of FIG. 1 according to embodiments of the disclosure.

Referring next to FIG. 4, assembly 43 of an electron source is depicted. Assembly 43 can include cathode member 44. As depicted in this Figure, member 44 can be a flat or stub cathode, however, hollow or cathode member 24 may be utilized as well. Cathode member 44 can be aligned along a longitudinal axis 52 and in accordance with at least one implementation, axis 52 can represent a center of member 24. Member 44 can be operatively aligned along this axis with anode 46 defining opening 58 defined therein.

A pair of lens 48 and 50 can be conductively associated with cathode member 44 and may form part of the cathode sharing the conductivity of same. Lens 48 defines at least one opening 54 offset from the center defined by axis 52 and lens 50 defines an opening 56 at the center. This alignment can provide a tortured path for electrons emanating from cathode member 44. With regard to lens 48, additional openings can be defined, and in accordance with some implementations, these openings may be associated with cathode sidewalls when utilized.

Figure 5:
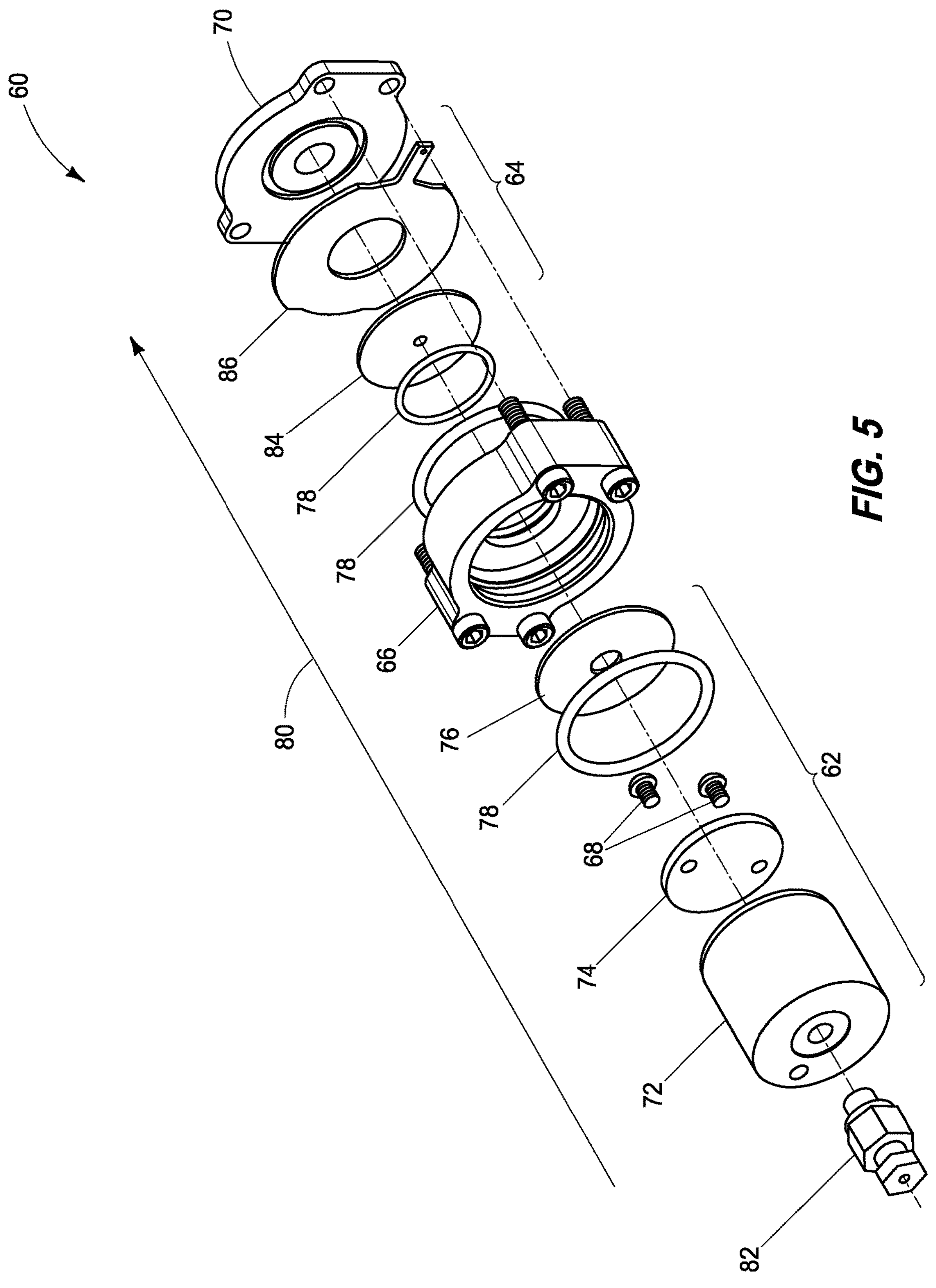
FIG. 5 is a depiction of a configuration of an ion source device for use with the instrument of FIG. 1 according to embodiments of the disclosure.

Referring next to FIG. 5, an exploded view of an electron source device 60 is shown. Device 60 includes a cathode assembly 62 operatively associated along longitudinal axis 68 with anode assembly 64 with insulators 66 and 70 operatively engaged therewith. Cathode assembly 62 can include cathode member having a conduit therethrough along axis 68 conductively engaged with lens 74 and 76. Lens 74 can define openings offset from the center defined by axis 68 in at least one cross section, and lens 76 can include at least one opening aligned on the center. A spacer ring 78 can be provided between lens 74 and 76 for example and this ring can be constructed of Viton (is a brand of synthetic rubber and fluoropolymer elastomer commonly used in O-rings. The name is a registered trademark of The Chemours Company. Viton fluoroelastomers are categorized under the ASTM D1418 and ISO 1629 designation of FKM), for example. To provide pressure differential 80, fluid such as helium may be provided via fluid source 82.

Anode assembly 64 can include a flow limiting lens 84 conductively associated with anode member 86. Viton O-rings 78 can be utilized to separate anode assembly 64 from insulator 66. In accordance with example configurations, a pressure of less than 1 torr can be maintained within the conduit of the cathode assembly when providing electrons to a sample to prepare analytes.

Analytes prepared by exposing sample to electrons from the devices of the present disclosure can proceed to analyzer 16. Analyzer 16 can include an ion transport gate (not shown), and a mass separator (not shown). The ion transport gate can be configured to gate the analyte beam of ions generated by the ion source. The ion transport gate can be configured to gate positive or negative analyte ions as generated from the ion source. Analyzer 16 can be any of those described in U.S. Pat. No. 7,582,867 issued Sep. 1, 2009, the entirety of which is incorporated by reference herein.

Analytes may proceed to detector 18. Exemplary detectors include electron multipliers, Faraday cup collectors, photographic and stimulation-type detectors. The detector can be configured as described herein with positive or negative voltages.

The progression of analysis from sample preparation and ionization 14 through analyzer 16 and to detector 18 can be controlled and monitored by a processing and control unit 20. Unit 20 can be configured to provide the specific configurations of the ion source device, the ion transporter, the analyzer and the detector as described herein. These configurations can include the specific polarity of voltages applied to each component.

Acquisition and generation of data according to the present disclosure can be facilitated with processing and control unit 20. Processing and control unit 20 can be a computer or mini-computer that is capable of controlling the various elements of instrument 10. This control includes the specific application voltages and may further include determining, storing and ultimately displaying mass spectra. Processing and control unit 20 can contain data acquisition and searching software. In one aspect, such data acquisition and searching software can be configured to perform data acquisition and searching that includes the programmed acquisition of the total analyte count. In another aspect, data acquisition and searching parameters can include methods for correlating the amount of analytes generated to predetermined programs for acquiring data.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. An electron source device, the device comprising:

a cathode member operatively aligned with an anode member, both members defining conduits in fluid communication, the cathode member extending along a longitudinal axis defining a center of the cathode member in one cross section;

a lens conductively associated with the cathode member, the lens defining at least one opening having a center axis offset from the longitudinal axis; and a pressure differential extending between the cathode member and the anode member, the pressure differential facilitating fluid flow through the cathode member and the anode member.

2. The device of claim 1 wherein the conduit of the cathode member extends through the longitudinal axis of the cathode member.

3. The device of claim 1 further comprising a fluid source in fluid communication with the conduit of the cathode member, the fluid source facilitating the pressure differential.

4. The device of claim 3 wherein the fluid source is a helium source.

5. The device of claim 1 wherein the device is operatively aligned with a sample stream.

6. The device of claim 5 wherein at least a portion of the sample stream is ionized with electrons.

7. The device of claim 6 wherein the ions are analyzed using ion mobility or mass selective detection.

8. A cathode assembly for an electron source device, the assembly comprising:

a cathode member operatively aligned with an anode member, the cathode member extending along a longitudinal axis, the longitudinal axis defining a center of the cathode member in one cross section; and a lens conductively associated with the cathode member, the lens defining at least one opening having a center axis offset from the longitudinal axis.

9. The assembly of claim 8 further comprising another opening defined by the lens.

10. The assembly of claim 9 wherein the openings are aligned across the center of the lens.

11. The assembly of claim 8 wherein the cathode member comprises sidewalls defining a recess within the cathode member.

12. The assembly of claim 11 wherein the at least one opening within the lens is operatively aligned with a sidewall of the cathode member.

13. The assembly of claim 8 wherein the cathode member comprises sidewalls defining a conduit within the cathode member.

14. The assembly of claim 13 further comprising another opening defined by the lens and opposing the at least one opening across the center of the lens, both openings being operatively aligned with opposing sidewalls of the conduit of the cathode member.

15. A lens assembly for an electron source device, the assembly comprising:

a pair of lenses conductively associated with a cathode member, the cathode member extending along a longitudinal axis, the longitudinal axis defining a center of the cathode member in one cross section; and wherein the lenses are aligned along the longitudinal axis, wherein a first lens of the pair of lenses defines an opening having a first center axis offset from the longitudinal axis, and wherein a second lens of the pair of lenses defines an opening having a second center axis aligned with the longitudinal axis.

16. The assembly of claim 15 further comprising another opening defined by the first lens.

17. The assembly of claim 16 wherein the openings are aligned across the center of the first lens.

18. The assembly of claim 15 wherein the cathode member comprises sidewalls defining a conduit within the cathode member.

19. The assembly of claim 18 further comprising another opening defined by the first lens and opposing the opening across the center of the first lens, both openings being operatively aligned with opposing sidewalls of the conduit of the cathode member.

20. An electron source device, the device comprising:

a cathode member operatively aligned with an anode member, both members defining conduits in fluid communication, wherein the cathode member extends along a longitudinal axis, the longitudinal axis defining a center of the cathode member in one cross section;

a pressure differential extending between the cathode member and the anode member, the pressure differential facilitating fluid flow through the cathode member and the anode member;

a first lens conductively associated with the cathode member, the first lens defining at least one opening having a center axis offset from the longitudinal axis; and a second lens conductively associated with the cathode member and the first lens, the second lens defining an opening at the center of the second lens.

* * * * *